US010771135B2

(12) United States Patent
Sheldon et al.

(10) Patent No.: US 10,771,135 B2
(45) Date of Patent: Sep. 8, 2020

(54) APPARATUS AND METHOD FOR ESTABLISHING AND MAINTAINING A COMMUNICATIONS LINK

(71) Applicant: The Johns Hopkins University, Baltimore, MD (US)

(72) Inventors: Colin Z. Sheldon, Fulton, MD (US); Marshall J. Jose, New Windsor, MD (US); Robert F. Henrick, Highland, MD (US); Jennifer N. Dumiak, Carlsbad, CA (US)

(73) Assignee: The Johns Hopkins University, Baltimore, MD (US)

( * ) Notice: Subject to any disclaimer, the term of this patent is extended or adjusted under 35 U.S.C. 154(b) by 72 days.

(21) Appl. No.: 15/422,806

(22) Filed: Feb. 2, 2017

(65) Prior Publication Data

US 2017/0223749 A1    Aug. 3, 2017

Related U.S. Application Data

(60) Provisional application No. 62/290,057, filed on Feb. 2, 2016.

(51) Int. Cl.
*H04B 7/06* (2006.01)
*H04W 16/28* (2009.01)

(52) U.S. Cl.
CPC .......... *H04B 7/0617* (2013.01); *H04W 16/28* (2013.01)

(58) Field of Classification Search
CPC .......................... H04B 7/0617; H04W 16/28
See application file for complete search history.

(56) References Cited

U.S. PATENT DOCUMENTS

| 8,744,395 B1* | 6/2014 | Mitchell | H04B 1/525 455/242.1 |
| 2014/0022125 A1* | 1/2014 | Zhu | H01Q 3/2611 342/377 |
| 2014/0292578 A1* | 10/2014 | Ibrahim | H01Q 3/34 342/368 |

* cited by examiner

*Primary Examiner* — Jackie Zuniga Abad
(74) *Attorney, Agent, or Firm* — Sung T. Kim

(57) ABSTRACT

An example apparatus for establishing a communications link is provided. The example apparatus may include a phased array antenna, a radio frequency beamformer, and a processor. The processor may be in operable communication with the radio frequency beamformer and configured to operate as an antenna controller. As the antenna controller, the processor may be configured to direct the radio frequency beamformer to steer an antenna beam generated by the phased array antenna in a plurality of beam directions across an operating range of the phased array antenna, determine a signal strength of a source signal received by the phased array antenna at each beam direction, determine a current beam direction, and direct the radio frequency beamformer to steer the antenna beam to the current beam direction.

20 Claims, 5 Drawing Sheets

APPARATUS AND METHOD FOR ESTABLISHING AND MAINTAINING A COMMUNICATIONS LINK

CROSS-REFERENCE TO RELATED APPLICATIONS

This application claims the benefit of U.S. Provisional Application No. 62/290,057 filed on Feb. 2, 2016, the entire contents of which are hereby incorporated herein by reference.

TECHNICAL FIELD

Example embodiments generally relate to communication devices and, more particularly, relate to devices for establishing and maintaining a communications link.

BACKGROUND

Interconnectivity between various types of devices is becoming increasingly pervasive with connectivity efforts such as the Internet of Things. New types of data are being gathered by various electronic devices. It is often desirable for these devices to establish a communications link to transfer various types of data. For example, in some applications, it may be necessary to establish and maintain a communication link, for example, with an access point to transfer data and make the data available in shared environments, such as in the cloud.

In some instances, it may be useful for mobile devices such as drones and other unmanned vehicles to establish and maintain a communications link for continuous data transfer during operation, such as, when the vehicle is continuously moving. However, using conventional techniques, the size, weight, and power requirements for circuitry used to establish and maintain such communications links can be detrimental to the cost and operation of mobile devices.

BRIEF SUMMARY OF SOME EXAMPLES

Accordingly, some example embodiments are directed to apparatuses and methods for establishing and maintaining a communications link. In this regard, an example apparatus for establishing a communications link is provided. The example apparatus may comprise a phased array antenna, and a radio frequency beamformer. The radio frequency beamformer may be in operable communication with the phased array antenna to control a direction of an antenna beam generated by the phased array antenna. The apparatus may further comprise a processor in operable communication with the radio frequency beamformer and configured to operate as an antenna controller. As the antenna controller, the processor may be configured to direct the radio frequency beamformer to steer the antenna beam in a plurality of beam directions across an operating range of the phased array antenna, determine a signal strength of a source signal received by the phased array antenna at each beam direction, and determine a current beam direction. The current beam direction may be the beam direction associated with a highest received signal strength of the source signal received for the plurality of beam directions. The processor may also be configured to direct the radio frequency beamformer to steer the antenna beam to the current beam direction.

According to some example embodiments, an example unmanned vehicle is provided. The example unmanned vehicle may comprise a movement control assembly, a phased array antenna, and a radio frequency beamformer. The radio frequency beamformer may be in operable communication with the phased array antenna to control a direction of an antenna beam generated by the phased antenna array. The example unmanned vehicle may also comprise a position sensor and a processor in operable communication with the movement control assembly, the radio frequency beamformer, and the position sensor. The processor may be configured to operate as an antenna controller and as an autopilot. As the autopilot, the processor may be configured to receive position data from the position sensor, and direct the movement control assembly to adjust a direction of movement of the unmanned vehicle based on the position data. Further, as the antenna controller, the processor may be configured to direct the radio frequency beamformer to steer the antenna beam in a plurality of beam directions across an operating range of the phased array antenna, determine a received signal strength of a source signal received by the phased array antenna at each beam direction, and determine a current beam direction. The current beam direction may be the beam direction associated with a highest received signal strength of the source signal for the plurality of beam directions. The processor may be further configured to direct the radio frequency beamformer to steer the antenna beam to the current beam direction, establish a communications link with a device transmitting the source signal, and track movement of the source signal to maintain the communications link.

According to some example embodiments, an example method for establishing and maintaining a communications link is provided. The example method may comprise directing a radio frequency beamformer to steer an antenna beam in a plurality of beam directions across an operating range of a phased array antenna, determining a signal strength of a source signal received by the phased array antenna at each beam direction, and determining a current beam direction. The current beam direction may be the beam direction associated with a highest received signal strength of the source signal among the plurality of beam directions. The example method may further comprise directing the radio frequency beamformer to steer the antenna beam to the current beam direction, establishing the communications link with a device transmitting the source signal, and tracking movement of the source signal to maintain the communications link.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
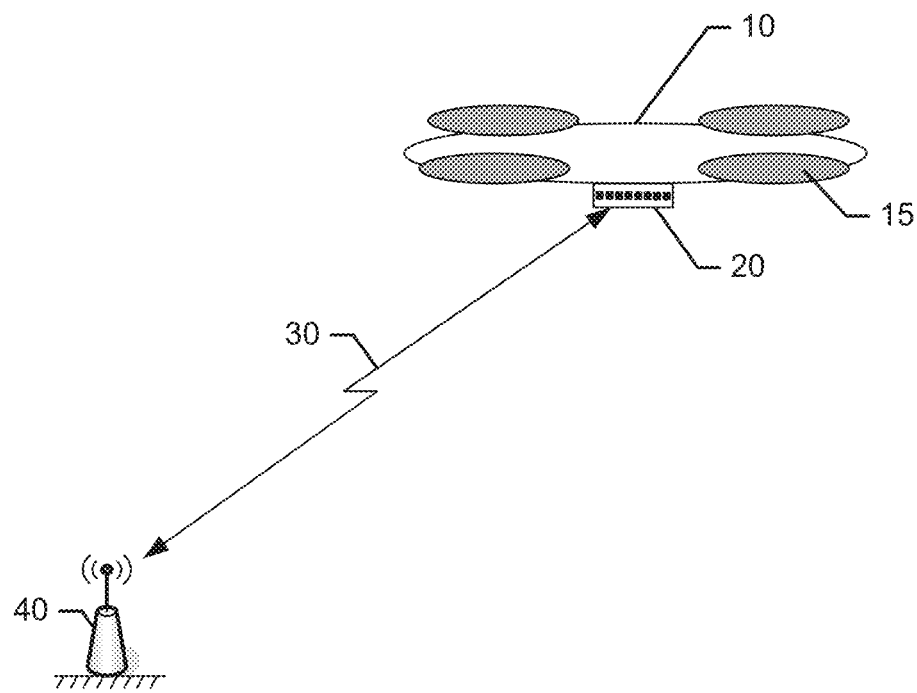
FIG. 1 shows a system utilizing a communication link where a phased array antenna is affixed to a vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

Example embodiments described herein generally operate to establish and maintain a communications link between at least two devices. In this regard, one of the devices may be an unmanned vehicle, such as, for example, a drone. According to some example embodiments, techniques may be implemented that utilize a phased array antenna to establish a high quality wireless communication link that has a relatively long link range, supports higher data rates, and uses less transmit power. The communication link may be established and maintained to adapt to ongoing relative motion between ends of the link to maintain the high quality characteristics. Maintenance of the communication link can be performed using motion compensation techniques in real or near real-time.

According to various example embodiments, a phased array antenna with a controllable beam may be utilized to establish and maintain the communication link. The phased array antenna may be used to transfer and receive data, track a position of the other end of the communication link, and adjust the antenna beam to maintain a high quality link.

Leveraging the use of a phased array antenna, according to some example embodiments, an apparatus and method may be implemented to facilitate the advantages of phased arrays into mobile devices by reusing the capabilities and processing that may be included in mobile devices. Phased array antennas can provide increased effective isotropic radiated power (EIRP) through steerable directional beams compared to omnidirectional antennas, and can provide additional capabilities including the potential for spectrum reuse through spatial multiplexing and interference rejection through steerable nulls.

By establishing and maintaining a communication link using a phased array antenna in accordance with some example embodiments, a number of advantages may be realized, including but not limited to, the ability to transmit at digital RF data rates at much longer ranges, to reject interference on commonly used frequency bands, to facilitate more user's ability to share frequency bands, to use higher frequency bands where antenna directivity is required to overcome higher propagation loss, and to reduce sizes of omni-directional antennas. Additionally, advantages not only to cost, but also the Size, Weight And Power (SWAP) may also be realized, which can be critical in small unmanned and mobile applications.

As further described herein, according to some example embodiments, existing hardware of mobile devices may be reused for the purpose of establishing and maintaining a high quality wireless communication link. In this regard, onboard sensors that support position determination such as global positioning system (GPS) sensors, tilt sensors, and compasses may be used together with existing programmable processors to establish and maintain a high quality communications link. Such features may be present in unmanned vehicles such as unmanned air vehicles (UAVs), and mobile devices including smartphones. As further described herein, some example embodiments enable a device to use sensors and processing on the device to steer a beam of a phased array antenna to maintain the communication link while the devices on the ends of the link are in stable or unstable motion.

Further, according to some example embodiments, an unmanned vehicle may implement the communications link establishing and maintaining techniques described herein by utilizing the navigation and control package (or autopilot) of a UAV. The processor of the navigation and control package may use sensors (e.g., compass and tilt sensors) to implement autopilot functionalities. However, according to some example embodiments, the same processor may also implement an antenna controller to perform beam steering and tracking, use a beam of the phased array antenna to identify and track relative movement, use the RF energy transmitted by a wireless signal source as part of a discovery process, and maintain subsequent two-way communications. In this regard, beam steering may be implemented by the processor of the navigation and control package.

Further, according to some example embodiments, position data obtained and utilized by an autopilot of a vehicle, such as a UAV, may be used to orient and continue to point to a known communicator to establish and maintain a link, either at a known fixed location, a predictable moving location, such as a satellite trajectory, or at a moving location that is conveyed during communication. Some example embodiments may utilize sensors that support the operation of the autopilot or location-based services to similarly maintain a communication link. According to some example embodiments, dedicated hardware, such as a separate processor may be utilized together with existing sensors to establish and maintain the communication link.

Figure 2:
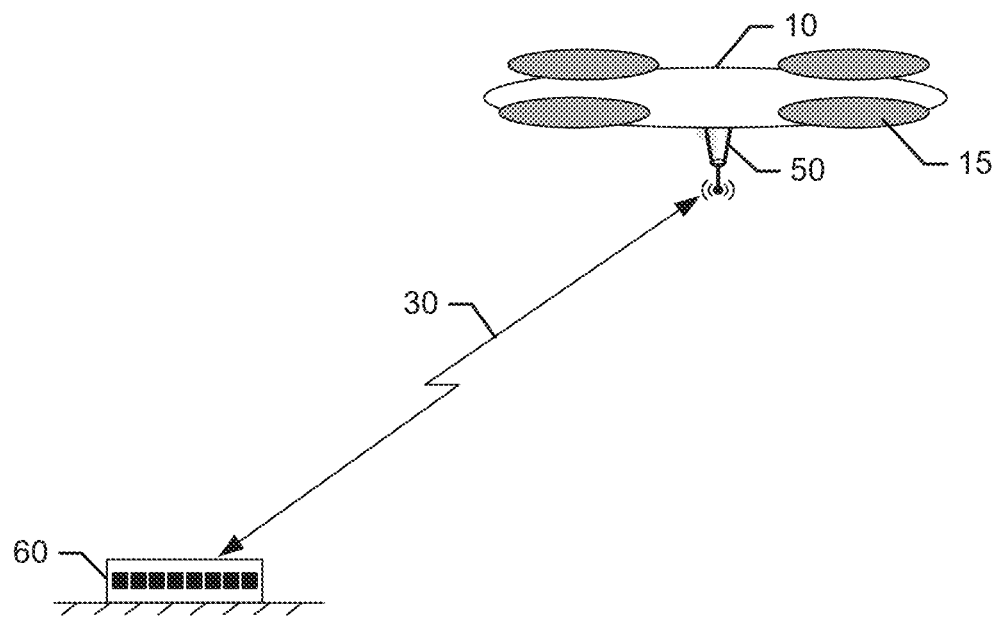
FIG. 2 shows a system utilizing a communication link where a phased array antenna is stationary according to an example embodiment.

In this regard, FIGS. 1 and 2 show systems that establish and maintain a communication link as described herein. With reference to FIG. 1, according to some example embodiments, an unmanned vehicle, such as drone 10 may include a phased array antenna 20. The phased array antenna 20 may be mounted on a bottom side of a UAV, such as the drone 10. Phased array antenna 20 may be controllable to steer an antenna beam to establish and maintain a communications link 30 with a stationary access point 40. Access point 40 may, but need not, have a directional antenna. As shown in FIG. 1, access point 40 includes an omni-directional antenna. With reference to FIG. 2, according to some example embodiments, an alternative system is shown where the drone 10 includes an omni-directional antenna 50 and a phased array antenna 60 disposed at a stationary location, for example, on the ground. Again, phased array antenna 60 may be controllable to steer an antenna beam to establish and maintain a communications link 30 with omni-directional antenna 50 of the drone 10. While FIGS. 1 and 2 illustrate examples where one of the ends of the communication link 30 is stationary, one of skill in the art would appreciate that some example embodiments described herein can be implemented in environments where one end of the communication link 30 is in a predictable moving location (e.g., a satellite) or in an unpredictable location (e.g., another drone). Further, it is contemplated that both ends of the communication link 30 may include a phased array antenna and use example embodiments as further described herein. Additionally, while some example embodiments are described with respect to operation of unmanned vehicles, it is contemplated that example embodiments may be utilized in association with any mobile device that can establish a communication link (e.g., smartphones, manned vehicles, or the like).

As described further herein, according to some example embodiments, a vehicle, including an unmanned vehicle, may include systems and assemblies to control the movement of the vehicle that are controllable by an autopilot. In this regard, a vehicle may include a movement control assembly that may include motors, gears, rotors, fins, rudders, wheels, brakes, or any other component that can be operated to control movement of the vehicle. With reference to FIGS. 1 and 2, rotors 15 may be part of a movement control assembly of the drone 10.

Figure 3:
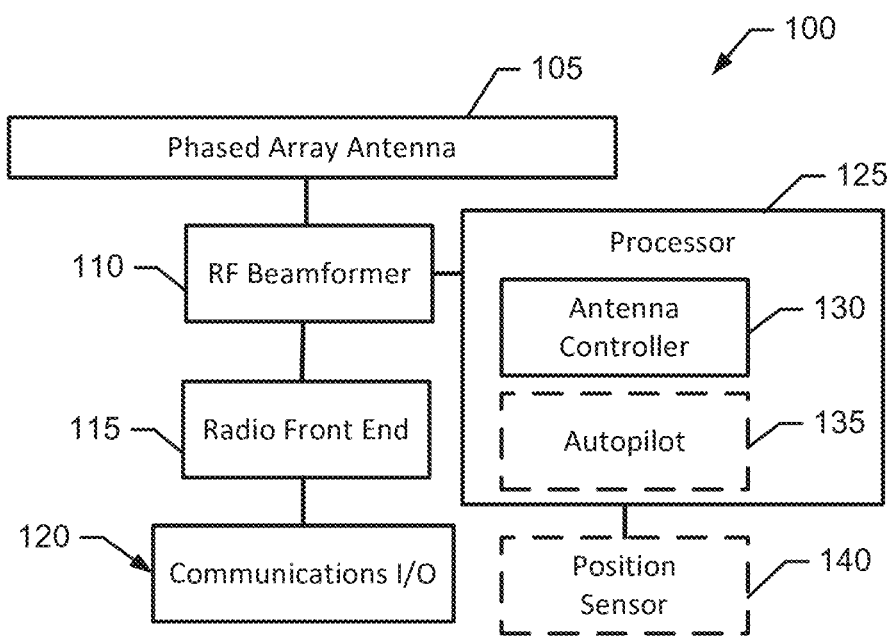
FIG. 3 shows a block diagram of an apparatus configured to establish and maintain a communication link according to an example embodiment.

FIG. 3 illustrates an example apparatus that may be operated on board an unmanned vehicle (e.g., a drone) or on a stationary communication access point as described herein to establish and maintain a communication link when relative movement may be present. The apparatus 100 may include a phased array antenna 105, a radio frequency (RF) beamformer 110, a radio front end 115, communication input/output (I/O) 120, a processor 125, and position sensor 140.

The phased array antenna 105 may be any type of antenna array capable of supporting beam steering. In this regard, for example, the phased array antenna 105 may be a 1×8 patch array with half-wavelength spacing (e.g., at 9.6 GHz). Each patch within the array may be fed by quarter-wavelength microstrip matching lines. While the phased array antenna 105 may include a single row of patches, it is contemplated that a matrix phased array antenna may be utilized. According to some example embodiments, the phased array antenna 105 may include any matrix of antenna elements, such as, for example, a 2×8 array or any M×N array. The implementation of a matrix of antenna elements can permit the antenna beam to be increasingly controllable in, for example, more than one dimension.

The RF beamformer 110 may be in operable communication with the phased array antenna 105 and may be configured to control a direction of an antenna beam generated by the phased array antenna 105. The RF beamformer 110 may be a corporate feed beamformer that uses phase shifting integrated circuits and power splitters (e.g., Wilkinson power splitters). The phased array antenna 105 may have a given operating range of possible beam directions that the RF beamformer 110 can cause the phased array antenna 105 to generate. RF beamformer 110 may be in operable communication with a processor 125, which may be configured to provide instructions to and direct the RF beamformer 110, to control a direction of the beam of the phased array antenna 105 accordingly.

The RF beamformer 110 may also be in operable communication with a radio front end 115. The radio front end 115 may be configured to, for example, modulate outbound data for transmission via a communication link and demodulate inbound data received via the communication link. Inbound data may be provided to the radio front end 115 via communications I/O 120. Outbound data may be provided to the communication I/O 120 by the radio front end 115. According to some example embodiments, the communications I/O 120 may be associated with the processor 125 or another processing device that is being utilized to support ongoing communications (e.g., two-way communications) via the communications link.

The processor 125 may include processing circuitry, as further described below. In some example embodiments where the apparatus 100 is a component of an unmanned vehicle, the processor 125 may operate in a dual role as both an antenna controller 130 and an autopilot 135. Further, according to some example embodiments, the processor 125 may be intended for use as an autopilot device to perform vehicle navigation and guidance control, but leveraged to also perform antenna control functions with respect to the phased array antenna 105.

Processor 125 may be configurable to perform actions in accordance with example embodiments described herein, including, for example, operations related to antenna control and navigation via an autopilot. The processor 125 may be configured to perform data processing, control function execution or other processing and management services according to an example embodiment. In some embodiments, the processor 125 may be embodied as a chip or chip set. In other words, the processor 125 may comprise one or more physical packages (e.g., chips) including materials, components or wires on a structural assembly (e.g., a baseboard). The processor 125 may be configured to encode data into, and decode data from, a signal.

In an example embodiment, the processor 125 may include one or more instances of a processor or sub-processor and a memory. As such, the processor 125 may be embodied as a circuit chip (e.g., an integrated circuit chip) configured (e.g., with hardware, software or a combination of hardware and software) to perform operations described herein.

The processor 125 may include one or more device interfaces or device interface mechanisms for enabling communication with other devices, such as, for example, RF beamformer 110 or radio front end 115. In some cases, the device interface may be any means such as a device or circuitry embodied in either hardware, or a combination of hardware and software that is configured to perform the functionalities described with respect the processor 125 described herein.

In an exemplary embodiment, a memory device that may be included in the processor 125 or external to the processor 125 may include one or more non-transitory memory devices such as, for example, volatile or non-volatile memory that may be either fixed or removable. The memory may be configured to store information, data, applications, instructions or the like for enabling the processor 125 to carry out various functions in accordance with exemplary embodiments. For example, the memory could be configured to buffer input data for processing by the processor 125. Additionally or alternatively, the memory could be configured to store instructions for execution by the processor 125. As yet another alternative, the memory may include instructions for implementing antenna controller 130 or autopilot 135. Among the contents of the memory, applications may be stored for execution by the processor 125 in order to carry out the functionality associated with each respective application. In some cases, the applications may include directions for control of the radio front end 115 or the components thereof to support inbound and outbound wireless communications.

The processor 125 may be embodied in a number of different ways. For example, the processor 125 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 125 may be configured to execute instructions stored in the memory or otherwise accessible to the processor 125. As such, whether configured by hardware or by a combination of hardware and software, the processor 125 may represent an entity (e.g., physically embodied in circuitry) capable of performing operations according to example embodiments while configured accordingly. Thus, for example, when the processor 125 is embodied as an ASIC, FPGA or the like, the processor 125 may be specifically configured hardware for conducting the operations described herein. Alternatively, as another example, when the processor 125 is embodied as an executor of software instructions, the instructions may specifically configure the processor 125 to perform the operations described herein.

In an example embodiment, the processor 125 may be embodied as, include or otherwise control an antenna controller 130 or an autopilot 135. As such, in some embodiments, the processor 125 may be said to cause each of the operations described in connection with the antenna controller 130 or the autopilot 135 by directing the antenna controller 130 or the autopilot 135 to undertake the corresponding functionalities responsive to execution of instructions or algorithms configuring the processor 125 accordingly.

According to some example embodiments where apparatus 100 is affixed to a vehicle, the processor 125 may be configured to operate as an autopilot 135 to, for example, control the movement of the vehicle and a movement control assembly. The processor 125 may be in communication with the position sensor 140, and based on position data provided by the position sensor 140, adjust a position of the vehicle. In this regard, the position sensor 140 may be configured to generate position data indicative of, for example, a geographic position of the apparatus 100. The position sensor 140 may be any type of sensor capable of assisting in determining positional information, such as, for example, a global positioning system (GPS) sensor, a gyroscope (e.g., 3-axis), an accelerometer (e.g., 3-axis), a tilt sensor, a compass, or the like. According to some example embodiments, the position sensor may be a six-degree-of-freedom sensor. According to some example embodiments, the antenna controller 130 may also leverage position data provided by the position sensor 140 to assist with steering the antenna beam to establish and maintain a communication link.

According to some example embodiments, the processor 125 may be configured to operate as an antenna controller 130, possibly in addition to being configured to support autopilot functions. In this regard, the processor 125 may direct the RF beamformer 110 to steer the beam of the phased array antenna 105 to establish and maintain a communication link. The antenna controller 130 may operate to both establish and maintain a communication link by controlling the steering of the antenna beam generated by the phased array antenna 105.

According to some example embodiments, to establish a communication link, the antenna controller 130 may direct the RF beamformer 110 to steer the antenna beam in a plurality of beam directions across the operating range of the phased array antenna 105 (e.g., +/−60 degrees). The antenna beam may be swept across the operating range using incremental steps, for example, 5 degree or 10 degree steps, which may be referred to as beam directions. In this regard, at each beam direction, characteristics of a source signal, transmitted from a device that will be a party to the communication link, may be captured for subsequent evaluation. For example, a received signal strength of the source signal may be a characteristic of the source signal at each beam direction that may be received by the phased array antenna 105, and measured and stored. Other characteristics may be the angle of arrival or a relative time difference of arrival across elements of the phased array antenna 105. According to some example embodiments, the antenna controller 130 may be configured to direct the RF beamformer 110 to sweep the beam across an operating range of the phased array antenna 105 more than one time (e.g., three times), and compile source signal characteristic data for each beam direction during each iteration.

Based on the characteristic data compiled for each beam direction, the antenna controller 130 may determine a current beam direction for assignment to use for the communication link. According to some example embodiments, the current beam direction, for example, may be determined and assigned to be the beam direction associated with a highest received signal strength of the source signal. In example embodiments where multiple sweeps of the operating range are performed, and associated characteristic data has been gathered for each beam direction, the current beam direction may be determined and assigned to the beam direction associated with the highest average or median signal strength.

Upon determining the current beam direction, the antenna controller 130 may direct the RF beamformer 110 to steer the antenna beam to the current beam direction via the phased array antenna 105 and establish the communications link with a device transmitting the source signal. Further, the antenna controller 130 may maintain the communication link by tracking movement of the source signal. In this regard, movement of the source signal may include any relative movement between the device transmitting the source signal and the phased array antenna 105.

According to some example embodiments, the antenna controller 130 may track the movement of the signal source in a number of ways. For example, the antenna controller 130 may track the source signal using an algorithm to repeatedly analyze characteristics of the source signal to determine which beam direction will support a high quality link. In general, the phased array antenna 105 may be controlled to sweep beam directions adjacent the current beam direction to determine if a beam direction adjustment is needed.

Figure 4:
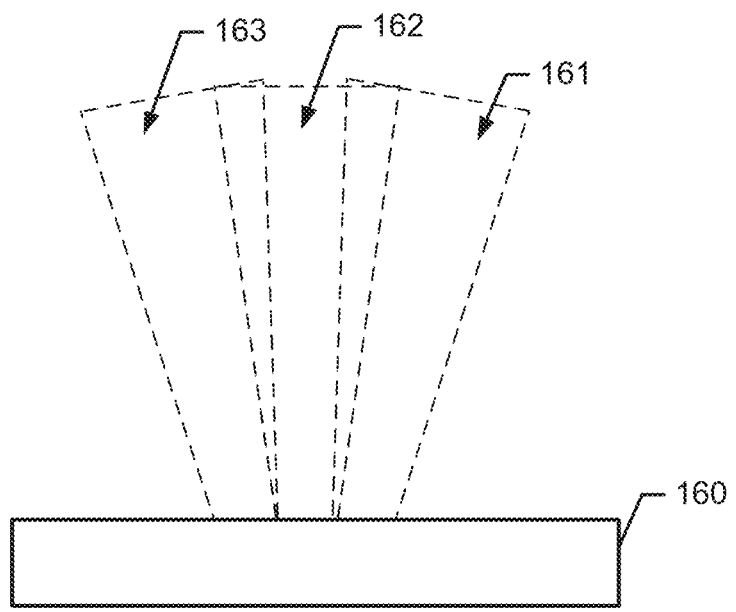
FIG. 4 shows a plurality of adjacent beam directions according to an example embodiment.

FIG. 4 shows a phased array antenna 160 and three possible beam directions 161, 162, and 163. Beam directions 161, 162, and 163 may be associated with respective antenna beams that have high overlap, which facilitates reduced signal loss when transitioning between adjacent beam directions. For explanation purposes, beam direction 162 (the central beam shown in FIG. 4) may be the current beam determined during establishment of the communication link as described above and otherwise herein. According to some example embodiments, elements of the apparatus 100 described above with respect to FIG. 3 may be used to update the beam direction to maintain the communication link. For example, the antenna controller 130 may determine, for example, the received signal strength of the source signal with the antenna beam being positioned at the current beam direction 162. The antenna controller 130 may also direct the RF beamformer 110 to steer the antenna beam away from the current beam direction 162 to a first beam direction 161. As shown in FIG. 4, the first beam direction 161 may be adjacent to the current beam direction 162. The antenna controller 130 may further determine the received signal strength of the source signal with the antenna beam being positioned at the first beam direction 161. The antenna controller 130 may also direct the RF beamformer 110 to steer the antenna beam to a second beam direction 163. Again, the second beam direction 163 may be adjacent to the current beam direction 162 and be a different beam direction than the first beam direction 161. The antenna controller 130 may also determine the received signal strength of the source signal with the antenna beam being positioned at the second beam direction 162. In this regard, while FIG. 4 shows the beam directions in a single dimension (i.e., on either side of the current beam direction 162), it is contemplated that adjacent beam directions may be adjacent in two dimensions (i.e., on either side or above and below the current beam direction 162). Further, as shown in FIG. 4, the RF beamformer 110 may steer the antenna beam such that the beam directions have portions of the beam that at least partially overlap the antenna beam generated at adjacent beam directions.

The antenna controller 130 may then determine an updated current beam direction. The updated current beam direction may be one of the current beam direction 162, the first beam direction 161, or the second beam direction 163. According to some example embodiments, the antenna controller 130 may determine the updated current beam direction based on which one of the current beam direction 162, the first beam direction 161, or the second beam direction 163 is associated with a highest signal strength.

According to some example embodiments, characteristics of the source signal may be obtained (e.g., the received signal strength may be measured) multiple times (e.g., ten times) for each of the current beam direction 162, the first beam direction 161, and the second beam direction 163. Median or average signal strengths may be determined for each beam direction. Accordingly, the antenna controller 130 may determine the updated current beam direction based on which of the current beam direction 162, the first beam direction 161, or the second beam direction 163 is associated with a highest median or average signal strength.

Additionally or alternatively, tracking movement of the source signal may be performed with the assistance of position sensor 140. In this regard, the antenna controller 130 may determine a point position or site of the phased array antenna based on position data received from the position sensor 140. In this regard, because, for example, the phased array antenna 105 may be rigidly affixed to a vehicle, the point position of the phased array antenna 105 may be determined based upon the position of the vehicle, which includes the attitude of the vehicle (e.g., pitch, yaw, roll, etc.). Further, the antenna controller 130 may continue to monitor movement of the phased array antenna 105 relative to the source signal based on the position data received from the position sensor, and direct the RF beamformer 110 to adjust a beam direction of the antenna beam in response to changes in the position data to maintain the communications link associated with the source signal.

Figure 5:
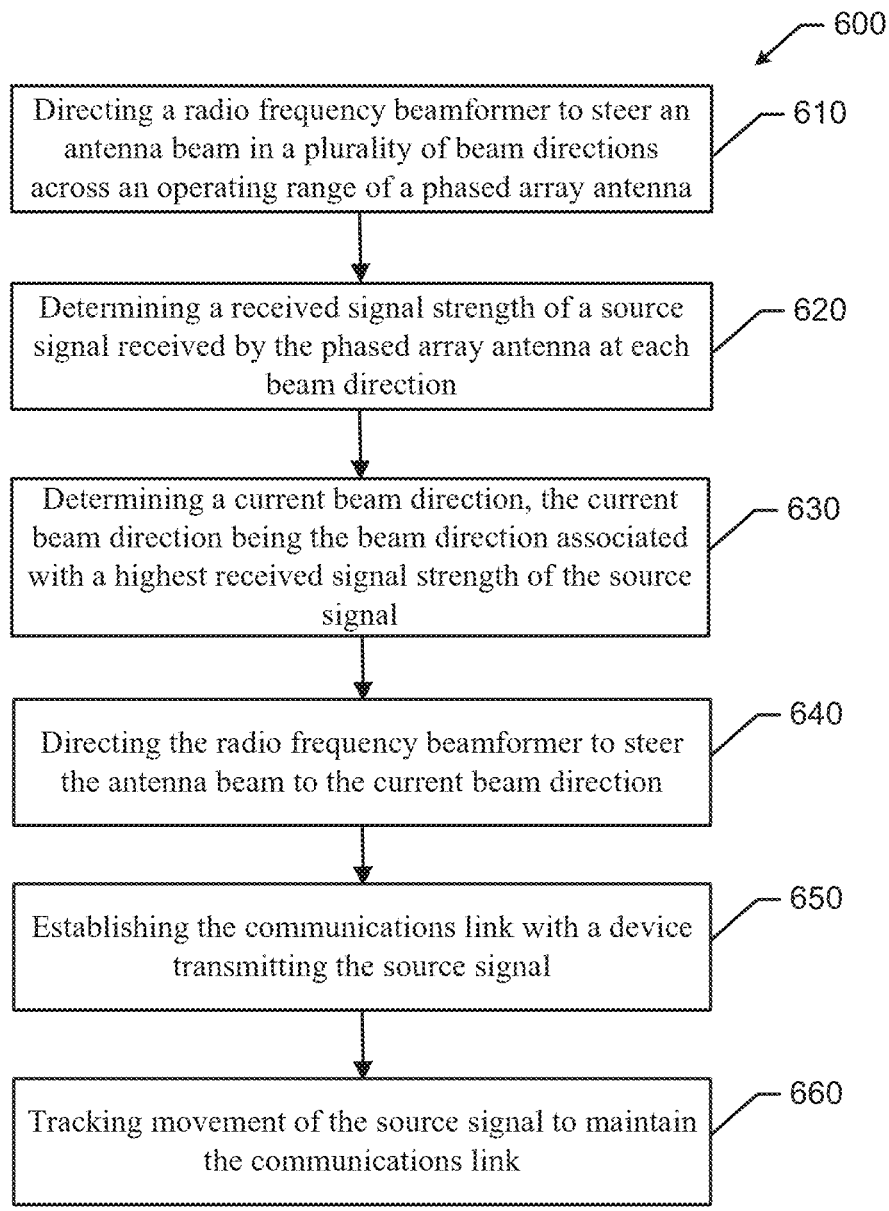
FIG. 5 shows a flow chart of a method for establishing a communication link according to an example embodiment.

Referring now to FIG. 5, a block diagram 600 of an example method for establishing and maintaining a communication link is provided. In this regard, the example method may include directing a radio frequency beamformer to steer an antenna beam in a plurality of beam directions across an operating range of a phased array antenna at 610, and determining a received signal strength of a source signal received by the phased array antenna at each beam direction at 620. The example method may further include, at 630, determining a current beam direction. In this regard, the current beam direction may be the beam direction (among the plurality of beam directions) associated with a highest received signal strength of the source signal. Further, the example method may include directing the radio frequency beamformer to steer the antenna beam to the current beam direction at 640, establishing the communications link with a device transmitting the source signal at 650, and tracking movement of the source signal to maintain the communications link at 660. According to some example embodiments, the example method may further include operations relating to navigation of a vehicle. In this regard, the example method may include receiving position data from the position sensor, and directing a movement control assembly to adjust a direction of movement of the unmanned vehicle based on the position data.

Figure 6:
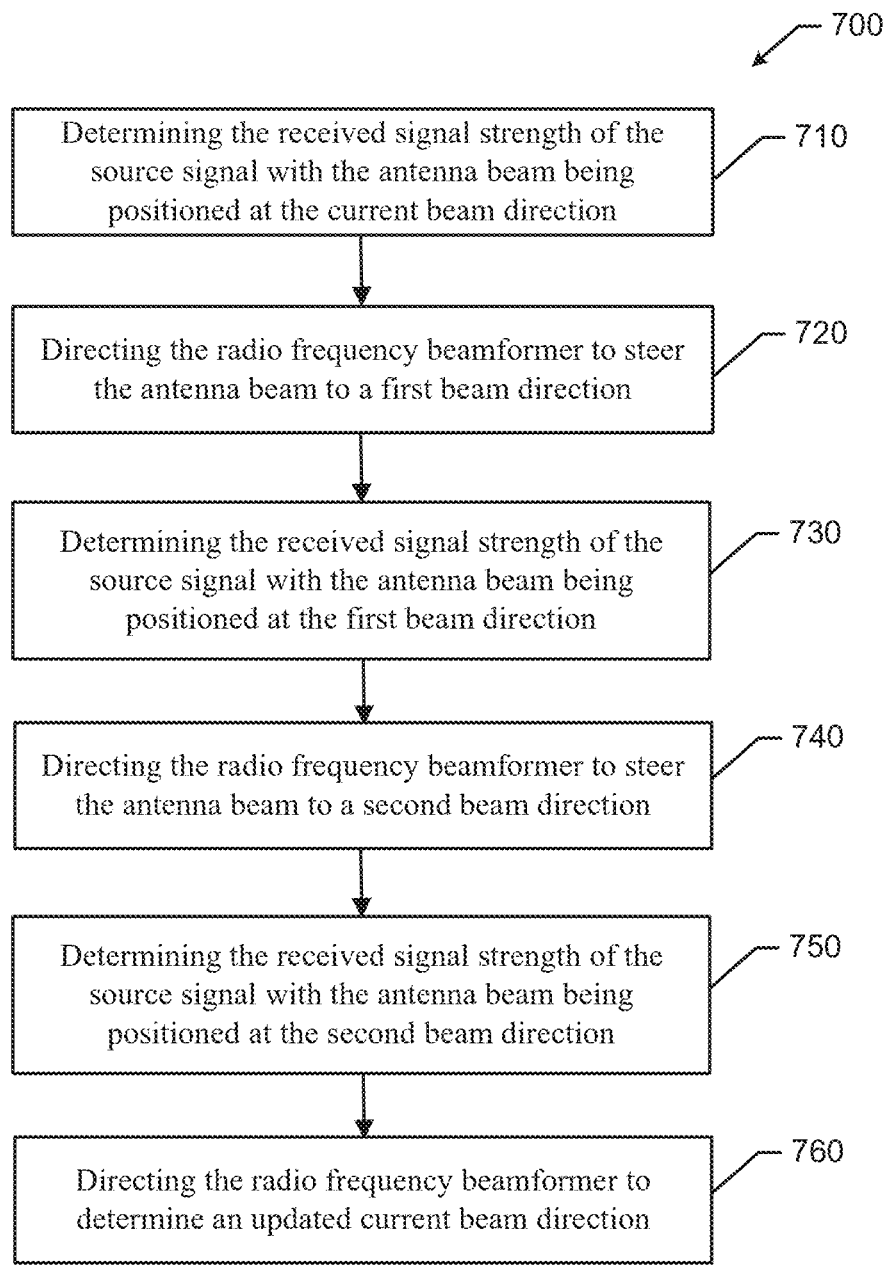
FIG. 6 shows a flow chart of a method for maintaining a communication link according to an example embodiment.

As described above and otherwise herein, tracking movement of the signal source may be performed in a number of ways. FIG. 6 is a block diagram 700 of an example method for tracking movement of the source signal according to some example embodiments. In this regard, the example method may include, at 710, determining the received signal strength of the source signal with the antenna beam being positioned at the current beam direction. Further, the example method may include directing the radio frequency beamformer to steer the antenna beam away from the current beam direction to a first beam direction at 720. In this regard, the first beam direction may be adjacent to the current beam direction. Further, the example method may include, at 730, determining the received signal strength of the source signal with the antenna beam being positioned at the first beam direction, and directing the radio frequency beamformer to steer the antenna beam to a second beam direction at 740. In this regard, the second beam direction may be adjacent to the current beam direction and may be a different beam direction than the first beam direction. The example method may further include, at 750, determining the received signal strength of the source signal with the antenna beam being positioned at the second beam direction, and, at 760, determining an updated current beam direction. The updated current beam direction may be determined to be one of the current beam direction, the first beam direction, or the second beam direction based on received signal strength corresponding to each respective beam direction.

Figure 7:
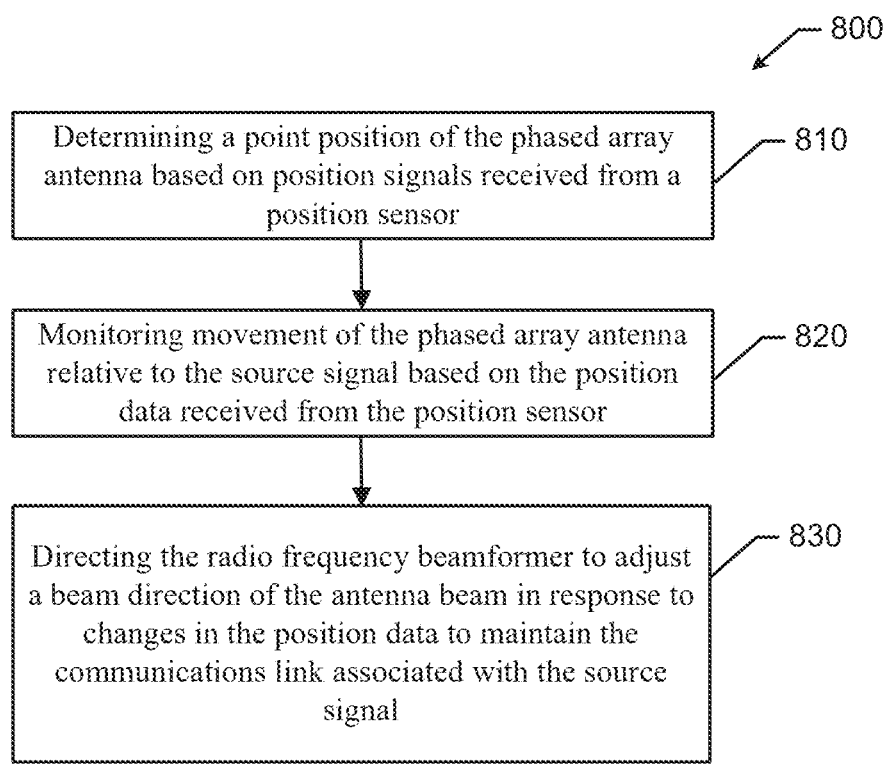
FIG. 7 shows a flow chart of another method for maintaining a communication link according to an example embodiment.

FIG. 7 is a block diagram 800 of another or supplemental example method for tracking movement of the source signal according to some example embodiments. In this regard, the example method may include, at 810, determining a point position of the phased array antenna based on position data received from a position sensor, and monitoring movement of the phased array antenna relative to the source signal based on the position data received from the position sensor at 820. The example method may further include directing the radio frequency beamformer to adjust a beam direction of the antenna beam in response to changes in the position data to maintain the communications link associated with the source signal at 830.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing description and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for establishing a communications link with a device transmitting a source signal, the apparatus comprising:
    a phased array antenna having a directional operating range;
    a position sensor configured to generate position data indicative of a position of the phased array antenna, the position data including pitch, roll, and yaw data;
    a radio frequency beamformer, wherein the radio frequency beamformer is in operable communication with the phased array antenna to control a direction of an antenna beam generated by the phased array antenna; and
    a processor in operable communication with the radio frequency beamformer and configured to operate as an antenna controller, the processor configured to:
        direct the radio frequency beamformer to steer the antenna beam in a plurality of beam directions across the directional operating range of the phased array antenna;
        determine a signal strength of the source signal received by the phased array antenna for each beam direction of the plurality of beam directions;
        determine a current beam direction, the current beam direction being a beam direction associated with a highest signal strength of the source signal received for the plurality of beam directions;
        direct the radio frequency beamformer to steer the antenna beam to the current beam direction;
        establish a communications link with the device transmitting the source signal with the antenna beam at the current beam direction; and
        track movement of the source signal to maintain the communications link by directing the radio frequency beamformer to adjust the current beam direction of the phased array antenna based on the pitch, roll, and yaw data provided by the position sensor.

2. The apparatus of claim 1, wherein the processor is configured to:
    direct the radio frequency beamformer to steer the antenna beam to each beam direction of the plurality of beam directions multiple times;
    determine an average signal strength of the source signal received by the phased array antenna for each beam direction of the plurality of beam direction; and
    determine the current beam direction based on a highest average signal strength of the source signal received for the plurality of beam directions.

3. The apparatus of claim 1, wherein the apparatus comprises an unmanned vehicle, and the phased array antenna is mounted on the unmanned vehicle.

4. The apparatus of claim 1, wherein the position sensor is configured to generate position data indicative of a geographic position of the apparatus.

5. The apparatus of claim 4, wherein the processor is further configured to operate as an autopilot for the apparatus based on the position data generated by the position sensor.

6. The apparatus of claim 4, wherein the position sensor comprises at least one of a global positioning system (GPS) sensor, a gyroscope, or an accelerometer.

7. The apparatus of claim 1, wherein the processor is further configured to track movement of the source signal to maintain the communications link by being configured to:
    determine the received signal strength of the source signal with the antenna beam being positioned at the current beam direction;
    direct the radio frequency beamformer to steer the antenna beam to a first beam direction, the first beam direction being adjacent to the current beam direction;
    determine the received signal strength of the source signal with the antenna beam being positioned at the first beam direction;
    direct the radio frequency beamformer to steer the antenna beam to a second beam direction, the second beam direction being adjacent to the current beam direction and being a different beam direction than the first beam direction;
    determine the received signal strength of the source signal with the antenna beam being positioned at the second beam direction; and
    determine an updated current beam direction, wherein the updated current beam direction is one of the current beam direction, the first beam direction, or the second beam direction.

8. The apparatus of claim 7, wherein the processor is configured to determine the updated current beam direction based on which one of the current beam direction, the first beam direction, or the second beam direction is associated with a highest signal strength.

9. The apparatus of claim 7, wherein the processor is further configured to:
    determine the received signal strength of the source signal corresponding to each of the current beam direction, the first beam direction, and the second beam direction multiple times; and
    determine the updated current beam based on which one of the current beam direction, the first beam direction, or the second beam direction is associated with a highest median signal strength.

10. The apparatus of claim 7, wherein the processor is further configured to direct the radio frequency beamformer to steer the antenna beam such that the antenna beam positioned in the first beam direction or the second beam direction at least partially overlaps the antenna beam positioned in the current beam direction.

11. The apparatus of claim 1, wherein the processor is configured to:
    determine a point position of the phased array antenna based on position data received from the position sensor; and
    monitor movement of the phased array antenna relative to the source signal based on the position data.

12. The apparatus of claim 11, wherein the position sensor comprises at least one of a global positioning system (GPS) sensor, a gyroscope, or an accelerometer.

13. An unmanned vehicle comprising:
a movement control assembly;
a phased array antenna rigidly affixed to the unmanned vehicle;
a radio frequency beamformer, wherein the radio frequency beamformer is in operable communication with the phased array antenna to control a direction of an antenna beam generated by the phased antenna array;
a position sensor configured to generate position data indicative of a geographic position of the unmanned vehicle; and
a processor in operable communication with the movement control assembly, the radio frequency beamformer, and the position sensor, wherein the processor is configured to operate as an antenna controller and as an autopilot for the unmanned vehicle;
wherein as the autopilot the processor is configured to:
receive the position data from the position sensor; and
direct the movement control assembly to adjust a direction of movement of the unmanned vehicle based on the position data; and
wherein as the antenna controller, the processor is configured to:
direct the radio frequency beamformer to steer the antenna beam in a plurality of beam directions across an operating range of the phased array antenna;
determine a received signal strength of a source signal received by the phased array antenna at each beam direction;
determine a current beam direction, the current beam direction being the beam direction associated with a highest received signal strength of the source signal for the plurality of beam directions;
direct the radio frequency beamformer to steer the antenna beam to the current beam direction;
establish a communications link with a device transmitting the source signal; and
track movement of the source signal to maintain the communications link by directing the radio frequency beamformer to adjust the current beam direction of the phased array antenna in response to and based on a change in the position data provided by the position sensor.

14. The unmanned vehicle of claim 13, wherein as the antenna controller, the processor is configured to track movement of the source signal by being further configured to:
determine the received signal strength of the source signal with the antenna beam being positioned at the current beam direction;
direct the radio frequency beamformer to steer the antenna beam to a first beam direction, the first beam direction being adjacent to the current beam direction;
determine the received signal strength of the source signal with the antenna beam being positioned at the first beam direction;
direct the radio frequency beamformer to steer the antenna beam to a second beam direction, the second beam direction being adjacent to the current beam direction and being a different beam direction than the first beam direction;
determine the received signal strength of the source signal with the antenna beam being positioned at the second beam direction; and
determine an updated current beam direction, wherein the updated current beam direction is one of the current beam direction, the first beam direction, or the second beam direction.

15. The unmanned vehicle of claim 13, wherein as the antenna controller, the processor is configured to track movement of the source signal by being further configured to:
determine a position of the phased array antenna based on position data received from the position sensor; and
monitor movement of the phased array antenna relative to the source signal based on the position data received from the position sensor.

16. The unmanned vehicle of claim 13, wherein the position sensor comprises at least one of a global positioning system (GPS) sensor, a gyroscope, or an accelerometer.

17. A method for establishing and maintaining a communications link, the method comprising:
directing a radio frequency beamformer to steer an antenna beam generated by a phased array antenna in a plurality of beam directions across a directional operating range of the phased array antenna;
determining a signal strength of a source signal received by the phased array antenna at each beam direction;
determining a current beam direction, the current beam direction being the beam direction associated with a highest received signal strength of the source signal among the plurality of beam directions;
directing the radio frequency beamformer to steer the antenna beam to the current beam direction;
establishing the communications link with a device transmitting the source signal; and
tracking movement of the source signal to maintain the communications link by directing the radio frequency beamformer to adjust the current beam direction of the phased array antenna based on pitch, roll, and yaw data provided by a position sensor.

18. The method of claim 17, wherein tracking movement of the source signal to maintain the communications link includes:
determining the received signal strength of the source signal with the antenna beam being positioned at the current beam direction;
directing the radio frequency beamformer to steer the antenna beam to a first beam direction, the first beam direction being adjacent to the current beam direction;
determining the received signal strength of the source signal with the antenna beam being positioned at the first beam direction;
directing the radio frequency beamformer to steer the antenna beam to a second beam direction, the second beam direction being adjacent to the current beam direction and being a different beam direction than the first beam direction;
determining the received signal strength of the source signal with the antenna beam being positioned at the second beam direction; and
determining an updated current beam direction, wherein the updated current beam direction is one of the current beam direction, the first beam direction, or the second beam direction.

19. The method of claim 17, wherein tracking movement of the source signal to maintain the communications link includes:
determining a point position of the phased array antenna based on position data received from the position sensor; and monitoring movement of the phased array antenna relative to the source signal based on the position data received from the position sensor.

20. The method of claim 17, further comprising:
receiving position data; and
directing movement of an unmanned vehicle comprising the phased array antenna based on the position data.

\* \* \* \* \*